United States Patent
Tanaka

(10) Patent No.: US 8,705,628 B2
(45) Date of Patent: Apr. 22, 2014

(54) METHOD AND DEVICE FOR COMPRESSING MOVING IMAGE

(75) Inventor: Yasuharu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 352 days.

(21) Appl. No.: 13/076,085

(22) Filed: Mar. 30, 2011

(65) Prior Publication Data

US 2011/0176027 A1 Jul. 21, 2011

Related U.S. Application Data

(63) Continuation of application No. PCT/JP2009/002867, filed on Jun. 23, 2009.

(30) Foreign Application Priority Data

Oct. 29, 2008 (JP) .................................. 2008-278247

(51) Int. Cl.
*H04B 1/66* (2006.01)
*H04N 11/04* (2006.01)

(52) U.S. Cl.
USPC .................................. 375/240.16; 348/416.1

(58) Field of Classification Search
USPC ......... 348/441, 448, 452, 458, 459, 451, 699, 348/700, 701, 222.1, 416.1; 375/240.01–240.26; 382/100, 199, 382/233, 286, 232
See application file for complete search history.

(56) References Cited

U.S. PATENT DOCUMENTS

| | | | | |
|---|---|---|---|---|
| 5,243,666 A | * | 9/1993 | Hasegawa et al. | 382/107 |
| 6,968,087 B1 | | 11/2005 | Oishi | |
| 2005/0036552 A1 | * | 2/2005 | Takahashi et al. | 375/240.16 |
| 2005/0232503 A1 | | 10/2005 | Oishi | |
| 2007/0098075 A1 | | 5/2007 | Ohgose et al. | |
| 2007/0237232 A1 | | 10/2007 | Chang et al. | |
| 2007/0242752 A1 | | 10/2007 | Kuzuya | |
| 2008/0247466 A1 | * | 10/2008 | Wang et al. | 375/240.16 |
| 2008/0279466 A1 | * | 11/2008 | Yang | 382/246 |
| 2009/0092189 A1 | * | 4/2009 | Tsuchiya et al. | 375/240.16 |
| 2009/0103621 A1 | * | 4/2009 | Numata et al. | 375/240.16 |
| 2009/0161982 A1 | * | 6/2009 | Tico et al. | 382/275 |
| 2009/0296819 A1 | * | 12/2009 | Oshikiri et al. | 375/240.16 |
| 2009/0316789 A1 | * | 12/2009 | Sasai et al. | 375/240.16 |
| 2010/0020878 A1 | * | 1/2010 | Liang et al. | 375/240.16 |
| 2010/0039557 A1 | * | 2/2010 | Mori et al. | 348/459 |
| 2010/0111182 A1 | * | 5/2010 | Karczewicz et al. | 375/240.16 |
| 2012/0051434 A1 | * | 3/2012 | Blum | 375/240.16 |

FOREIGN PATENT DOCUMENTS

| | | |
|---|---|---|
| JP | 07-255057 | 10/1995 |
| JP | 2001-25020 | 1/2001 |
| JP | 2001-036908 | 2/2001 |
| JP | 2004-328799 | 11/2004 |
| JP | 2007-006390 | 1/2007 |
| JP | 2007-124408 | 5/2007 |
| JP | 2008-160359 | 7/2008 |
| WO | WO 00/64187 | 10/2000 |

* cited by examiner

*Primary Examiner* — Behrooz Senfi
(74) *Attorney, Agent, or Firm* — McDermott Will & Emery LLP

(57) ABSTRACT

A still block detector is provided at a stage before a moving image encoder. The still block detector divides a frame to be processed into a plurality of blocks, sorts the blocks in the frame in ascending order of movement amount, and sets the first one or more blocks the number of which is specified by a "corresponding block setting number" input from the outside of an encoding device, to "still blocks." For the still blocks, the moving image encoder performs an inter-encoding process with respect to a moving image by forcibly setting motion vectors to zeros without performing a motion search or by forcibly setting DCT coefficients to zeros without performing DCT or quantization.

12 Claims, 14 Drawing Sheets

METHOD AND DEVICE FOR COMPRESSING MOVING IMAGE

CROSS-REFERENCE TO RELATED APPLICATIONS

This is a continuation of PCT International Application PCT/JP2009/002867 filed on Jun. 23, 2009, which claims priority to Japanese Patent Application No. 2008-278247 filed on Oct. 29, 2008. The disclosures of these applications including the specifications, the drawings, and the claims are hereby incorporated by reference in their entirety.

BACKGROUND

The present disclosure relates to apparatuses having a function of capturing moving images, such as digital cameras, camera phones, etc., and moving image compressing (encoding) techniques which are employed when image contents are produced or used.

In recent years, moving image compressing (encoding) techniques, such as the moving picture experts group (MPEG) etc., which can perform highly efficient encoding, have been rapidly put into practice and widely used in camcorders, mobile telephones, etc.

In encoding techniques, such as MPEG etc., various encoding modes are defined in the standards. For example, in MPEG-4, there are two modes: "intra-encoding mode" in which encoding is performed with respect to only an image which is contained in a frame of interest (hereinafter referred to as a target image); and "inter-encoding mode" in which an image region having a strong correlation with a target image is searched for (hereinafter referred to as a motion search) in a frame which has already been encoded (hereinafter referred to as a reference frame), and encoding is performed with respect to only a difference value between an image after the motion search (hereinafter referred to as a motion-compensated image) and the target image.

In the inter-encoding mode, discrete cosine transform (DCT) and quantization are applied to the difference image between an input image and a motion-compensated image, and thereafter, a combination of the resulting data, i.e., DCT coefficients, and a motion vector indicating the position of an image to be referenced in a reference frame are variable-length encoded to generate a stream (see the MPEG-4 standard).

More specifically, in the inter-encoding mode, if the input image and the motion-compensated image completely match, i.e., the difference image is zero, zero is input with respect to DCT and quantization, and zero is output as the result. If the difference image is not zero, but is not very large, zero may be output as the result of quantization. Thus, when the output result is zero, DCT and quantization are not performed, i.e., skipped, and the result is replaced with zero, which is then output, resulting in higher speed (see Japanese Patent Publication No. 2004-328799).

SUMMARY

However, in order to determine whether or not the difference image is zero, i.e., whether or not DCT and quantization can be skipped, it is necessary to actually perform a motion search with respect to macroblocks to generate the difference image. Therefore, it is not possible to know the number of macroblocks for which DCT and quantization can be skipped, before the start of frame processing. Therefore, there is a problem that how much frame processing can be sped up cannot be measured before the start of the process. For example, while in some cases it is possible that DCT and quantization are skipped for all the macroblocks in one frame and therefore frame processing is sped up, it is also possible that DCT and quantization are not skipped for any of the macroblocks in one frame and therefore frame processing is not sped up at all.

The present disclosure describes implementations of a technique of invariably speeding up frame processing by more than a predetermined rate to reduce the size and power consumption of an encoding system.

A first example method for encoding a moving image using motion vectors which are generated by dividing a frame to be processed into a plurality of blocks and performing a motion search with respect to each of the plurality of blocks using an input image and an already encoded reference image, includes the steps of selecting S blocks from the plurality of blocks in the frame, where S is an integer of one or more, and encoding the moving image by forcibly replacing the motion vectors with zeros without performing the motion search, with respect to the selected S blocks.

As a result, in a frame to be encoded, more than a predetermined number of blocks with respect to which a motion search does not need to be performed can invariably be selected, whereby frame processing can be sped up.

A second example method for encoding a moving image using DCT coefficients which are generated by dividing a frame to be processed into a plurality of blocks and performing DCT and quantization with respect to each of the plurality of blocks, includes the steps of selecting S blocks from the plurality of blocks in the frame, where S is an integer of one or more, and encoding the moving image by forcibly replacing the DCT coefficients with zeros without performing the DCT and the quantization, with respect to the selected S blocks.

As a result, in a frame to be encoded, more than a predetermined number of blocks with respect to which DCT and quantization do not need to be performed can invariably be selected, whereby frame processing can be sped up.

A third example method for encoding a moving image using motion vectors which are generated by dividing a frame to be processed into a plurality of blocks and performing a motion search with respect to each of the plurality of blocks using an input image and an already encoded reference image, includes a first step of detecting and storing image movement amounts into a movement amount storage, a second step of comparing the image movement amounts stored in the movement amount storage to select S blocks having the smallest image movement amounts from the plurality of blocks in the frame, where S is an integer of one or more, and a third step of encoding the moving image by forcibly replacing the motion vectors with zeros without performing the motion search, with respect to the selected S blocks. At the same time that the third step is performed with respect to one frame, movement amounts to be used in the third step at the next frame are obtained in the first and second steps.

As a result, the movement amount detection is performed at the same time that a previous frame is processed, whereby frame processing can be further sped up.

A fourth example method for encoding a moving image using DCT coefficients which are generated by dividing a frame to be processed into a plurality of blocks and performing DCT and quantization with respect to each of the plurality of blocks, includes a first step of detecting and storing image movement amounts into a movement amount storage, a second step of comparing the image movement amounts in the movement amount storage, and selecting S blocks having the smallest image movement amounts from the plurality of blocks in the frame, where S is an integer of one or more, and a third step of encoding the moving image by forcibly replacing the DCT coefficients with zeros without performing the DCT and the quantization, with respect to the selected S blocks. At the same time that the third step is performed with respect to one frame, movement amounts to be used in the third step at the next frame are obtained in the first and second steps.

As a result, the movement amount detection is performed at the same time that a previous frame is processed, whereby frame processing can be further sped up.

A first example device for encoding a moving image using motion vectors which are generated by dividing a frame to be processed into a plurality of blocks and performing a motion search with respect to each of the plurality of blocks using an input image and an already encoded reference image, includes an input image reducer configured to reduce the input image to be encoded, by a factor of n, where n is an integer of one or more, to generate a reduced input image, a reference image reducer configured to reduce the already encoded reference image by a factor of n to generate a reduced reference image, a movement amount detector configured to receive the reduced input image and the reduced reference image from the input image reducer and the reference image reducer, and detect a movement amount with respect to each of the plurality of blocks, a movement amount storage configured to store the movement amounts detected by the movement amount detector, a still block selector configured to compare the movement amounts stored in the movement amount storage to select S blocks having the smallest movement amounts, where S is an integer of one or more, and a moving image encoder configured to encode the moving image by forcibly replacing the motion vectors with zeros without performing the motion search, with respect to the selected S blocks.

As a result, in a frame to be encoded, more than a predetermined number of blocks with respect to which a motion search does not need to be performed can invariably be selected, whereby frame processing can be sped up.

A second example device for encoding a moving image using DCT coefficients which are generated by dividing a frame to be processed into a plurality of blocks and performing DCT and quantization with respect to each of the plurality of blocks, includes an input image reducer configured to reduce the input image to be encoded, by a factor of n, where n is an integer of one or more, to generate a reduced input image, a reference image reducer configured to reduce the already encoded reference image by a factor of n to generate a reduced reference image, a movement amount detector configured to receive the reduced input image and the reduced reference image from the input image reducer and the reference image reducer, and detect a movement amount with respect to each of the plurality of blocks, a movement amount storage configured to store the movement amounts detected by the movement amount detector, a still block selector configured to compare the movement amounts stored in the movement amount storage to select S blocks having the smallest movement amounts, where S is an integer of one or more, and a moving image encoder configured to encode the moving image by forcibly replacing the DCT coefficients with zeros without performing the DCT and the quantization, with respect to the selected S blocks.

As a result, in a frame to be encoded, more than a predetermined number of blocks with respect to which DCT and quantization do not need to be performed can invariably be selected, whereby frame processing can be sped up.

According to the present disclosure, in a frame, more than a predetermined number of blocks which have smaller movement amounts are decided as ones that are forcibly encoded into "a motion vector=0" and "a difference image=0." Therefore, it is not necessary to perform a motion search, DCT, and quantization with respect to those blocks, and therefore, a moving image encoding process can be more quickly completed. Also, because the moving image encoding process can be more quickly completed, it can be expected that power consumption will be reduced.

DETAILED DESCRIPTION

Figure 1:
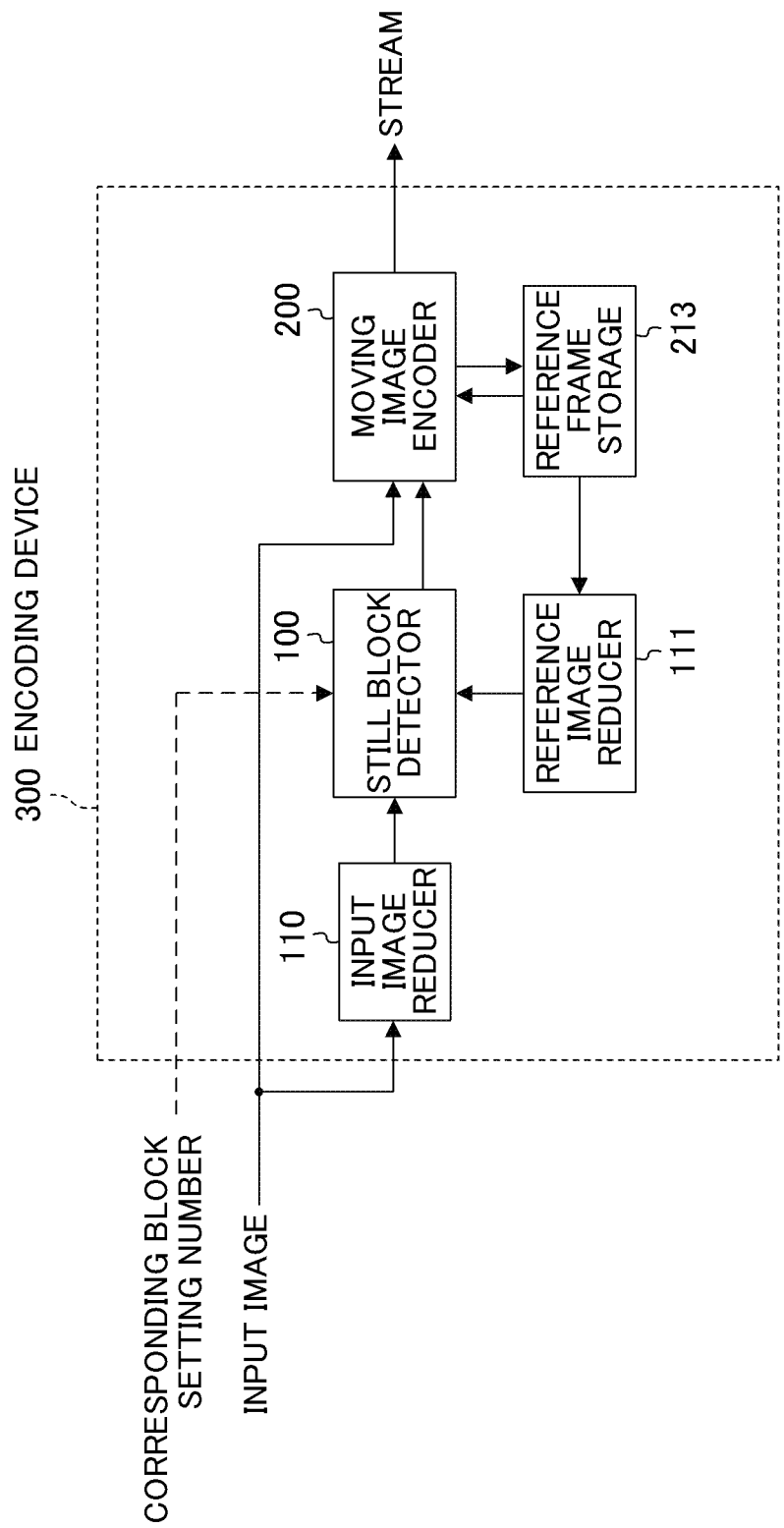
FIG. 1 is a block diagram showing a configuration of an encoding device according to a first embodiment of the present disclosure.

Embodiments of the present disclosure will be described hereinafter with reference to the accompanying drawings. Note that like parts are indicated by like reference characters.

First Embodiment

FIG. 1 is a block diagram showing a configuration of an encoding device according to a first embodiment of the present disclosure. As shown in FIG. 1, the encoding device 300 includes an input image reducer 110, a reference image reducer 111, a still block detector 100, a moving image encoder 200, and a reference frame storage 213.

<Function of Each Element>

The input image reducer 110 receives an input image to be encoded, reduces a frame image by a factor of n (n is an integer of one or more), and outputs the resultant frame image to the still block detector 100. Similarly, the reference image reducer 111 receives a reference frame from the reference frame storage 213 which stores a frame (reference frame) which has already been encoded, reduces a frame image by a factor of n, and outputs the resultant frame image to the still block detector 100. The still block detector 100 uses the input image received from the input image reducer 110 and the reference image received from the reference image reducer 111 to detect movement amounts of an image on a block-by-block basis, where each block includes m×m pixels (m is an integer of one or more). The detection of the movement amounts will be described later.

After the image movement amount detection is completed, the blocks in a frame are sorted in ascending order of movement amount, i.e., the smallest first, and the first one or more blocks (i.e., blocks having the smallest movement amounts) the number of which is specified by a "corresponding block setting number" input from the outside of the encoding device 300, are set to "still blocks."

The moving image encoder 200 receives still block information from the still block detector 100, the input image, and a reference image from the reference frame storage 213, and performs an encoding process in accordance with a moving image encoding standard. When the encoding process (inter-encoding process) is performed, a moving image encoding process is performed with respect to the still blocks as follows. A motion search is not performed and the motion vectors are forcibly set to zeros, and DCT and quantization are not performed and the DCT coefficients are forcibly replaced with zeros.

As a result, a motion search, DCT, and quantization can be skipped for the still blocks, whereby the process can be sped up.

<Detection of Still Blocks>

Figure 2:
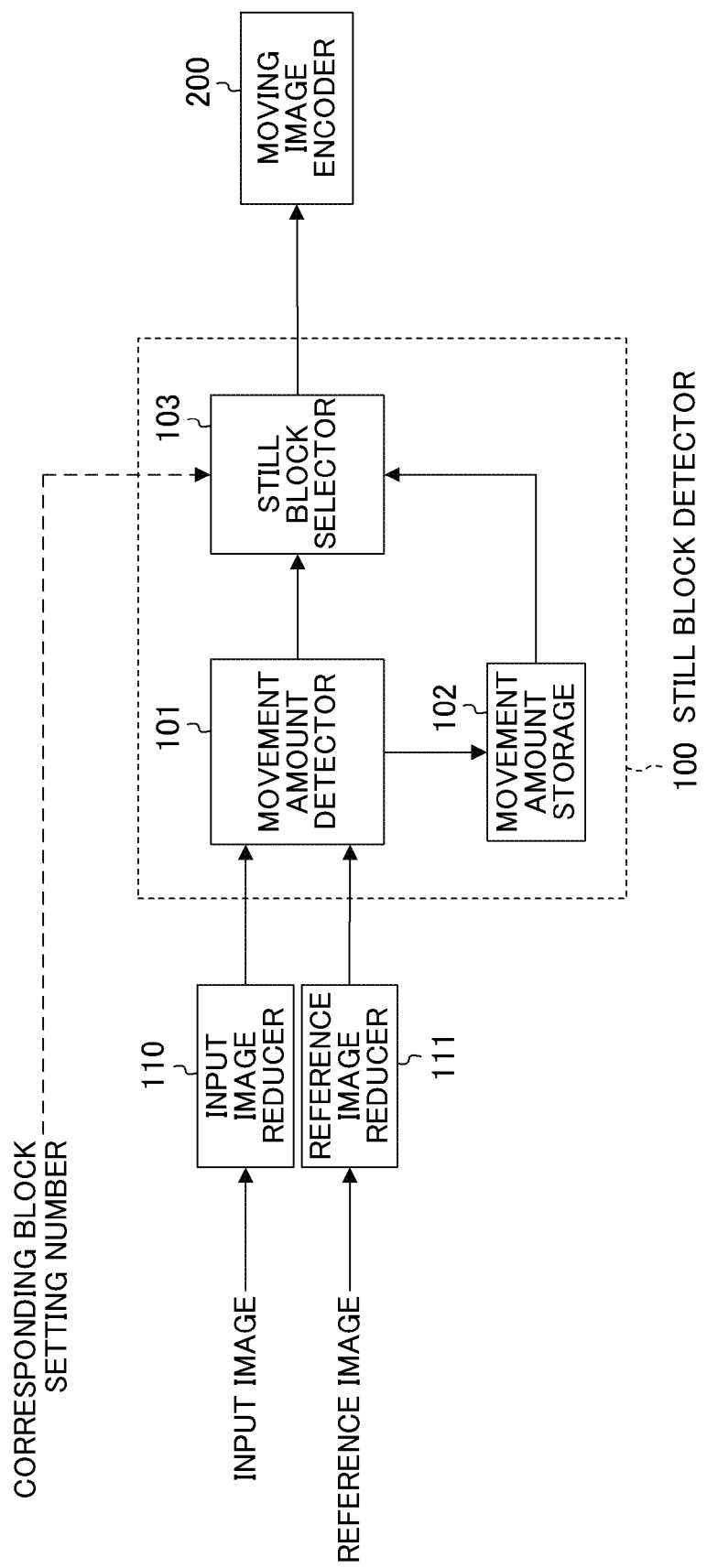
FIG. 2 is a block diagram showing a detailed configuration of a still block detector of FIG. 1.

FIG. 2 shows a detailed configuration of the still block detector 100 of FIG. 1. As shown in FIG. 2, the still block detector 100 includes a movement amount detector 101, a movement amount storage 102, and a still block selector 103.

The image movement amount detection performed by the still block detector 100 will be described with reference to FIG. 2. The input image is reduced by a factor of n by the input image reducer 110. The reference image is also reduced by a factor of n by the reference image reducer 111. These images are input to the movement amount detector 101 on a block-by-block basis, where each block includes p×p pixels (p is an integer of one or more).

The movement amount detector 101 calculates the total sum of differences between the p×p pixels of the input image and the p×p pixels of the reference image by:

$$\text{movement amount} = \Sigma\Sigma|\text{input image }(i,j) - \text{reference image }(i,j)| \quad (1)$$

where i and j are each an integer of 1 to p.

The movement amount is calculated for every p×p pixels, and the result is stored into the movement amount storage 102. When the movement amount detection is completed for one frame, the movement amount storage 102 stores movement amount information corresponding to the one frame. The movement amounts are sorted in ascending order, and are successively output to the still block selector 103 from the smallest movement amount. The still block selector 103 uses the movement amount information transferred from the movement amount storage 102 and the corresponding block setting number input from the outside to determine which block (m×m) in one frame image having the original size corresponds to a still block.

In the still block determination, information calculated for every p×p pixels with respect to an image obtained by reducing a frame by a factor of n needs to be converted into information for every m×m pixels with respect to an image having the same size as that of a frame (non-reduced image). To facilitate this, p is set to m/n (the block size p×p of the reduced image is equal to 1/n of the block size m×m of the non-reduced image), or p is set to m (the same processing unit is used for both the reduced image and the non-reduced image).

Figure 3:
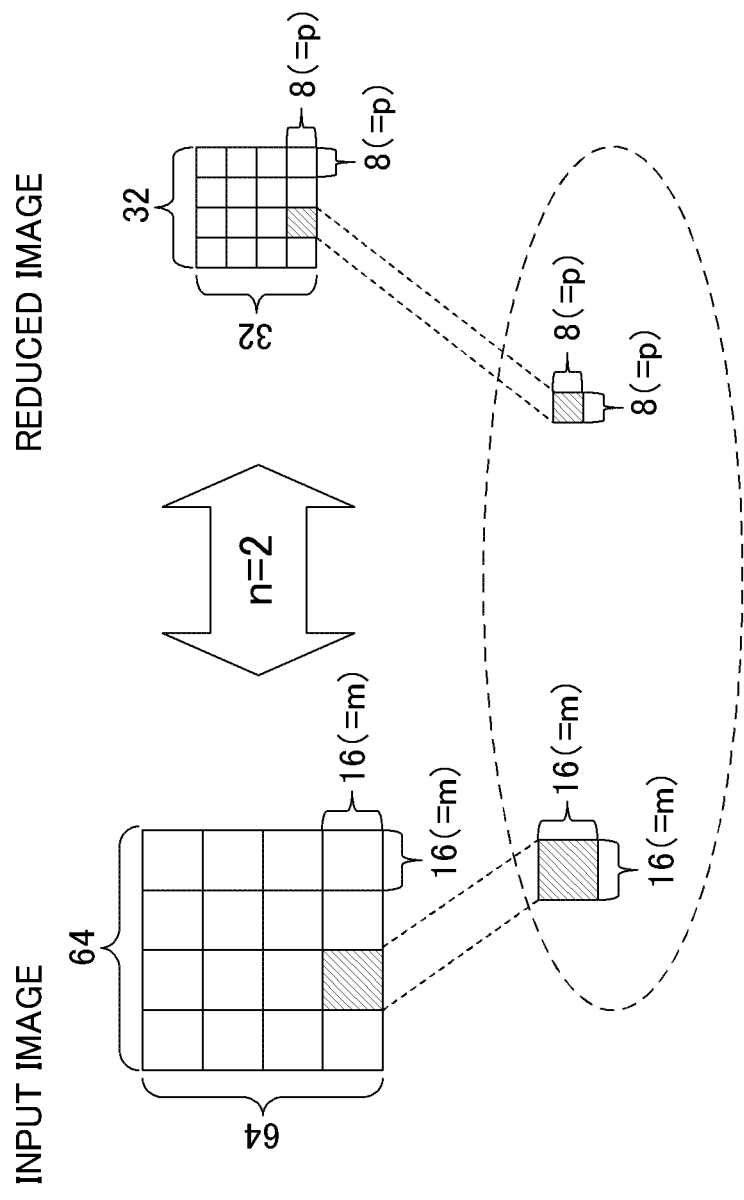
FIG. 3 is a diagram showing a first correspondence relationship between an input image and a reduced image in the encoding device of FIG. 1.

In the case of "p=m/n," one block which is processed using the reduced image may be directly converted into one block of the non-reduced image in a one-to-one correspondence. Here, an example where p=8, m=16, and n=2 is shown in FIG. 3.

Figure 4:
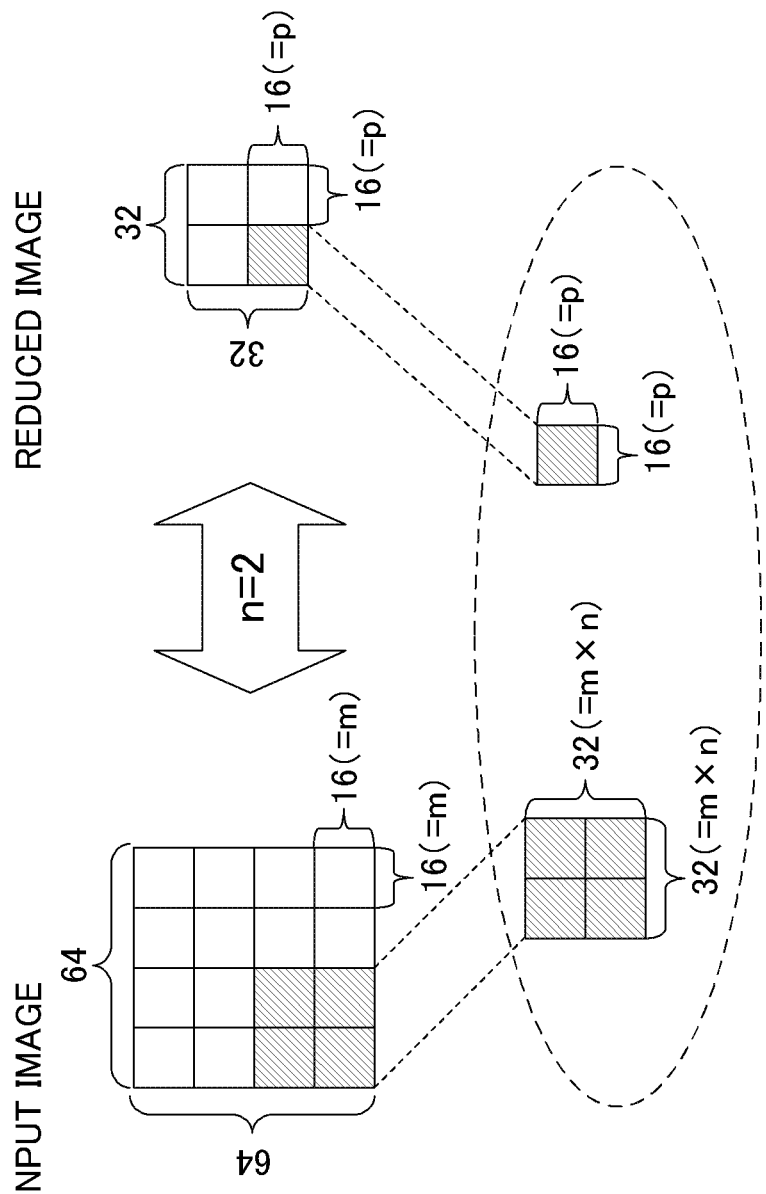
FIG. 4 is a diagram showing a second correspondence relationship between an input image and a reduced image in the encoding device of FIG. 1.

In the case of "p=m," one block which is processed using the reduced image may be converted into one region including n×n blocks of the non-reduced image. Here, an example where p=16, m=16, and n=2 is shown in FIG. 4.

A benefit of the former case is that the still block determination is performed using the same number of blocks in the reduced image as there are blocks in the input image, i.e., on a smallest block basis. A benefit of the latter case is that the number of blocks in the reduced image can be reduced compared to the input image, and therefore, the capacity of the movement amount storage 102 required to store movement amount information of all the blocks in the reduced image can be reduced.

Figure 5:
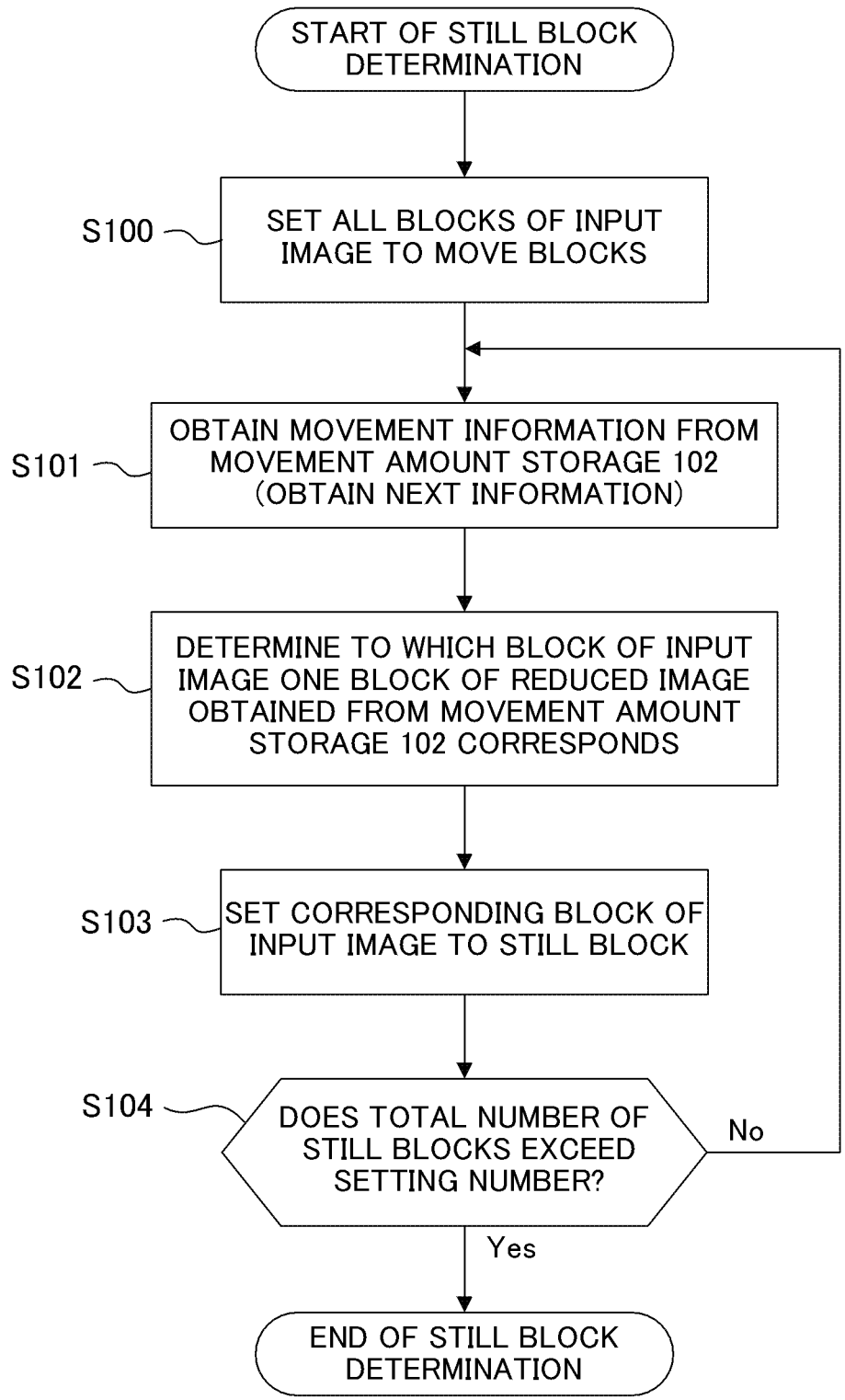
FIG. 5 is a flowchart showing operation of a still block selector of FIG. 2.

The still block selector 103 uses the above relationship between p, m, and n to determine to which block of the input image one block of the reduced image output from the movement amount storage 102 corresponds, and performs a control so that the number of blocks of the input image corresponding to still blocks is greater than or equal to the corresponding block setting number. A specific process flow will be described with reference to FIG. 5.

Initially, all the blocks in one frame of the input image are set to "move blocks." A move block indicates that the block is not a still block. A motion search, DCT, and quantization, which are of a typical encoding process, are performed with respect to the move block (S100).

Next, portions of information indicating movement amounts stored in the movement amount storage 102 are obtained one by one in ascending order, i.e., the smallest first (S101). Thereafter, based on the information, it is determined which block in the input image corresponds to a still block, depending on the relationship between p, m, and n shown in FIGS. 3 and 4 (S102). The corresponding block is determined to be a still block (S103). For the still block thus determined, a motion search, DCT, and quantization are skipped in the subsequent encoding process.

Finally, the total number of still blocks determined in S103 is counted, and it is determined whether or not the count exceeds the corresponding block setting number (S104). If the determination is positive, the still block determining process is ended. If the determination is negative, control returns to S101 and a still block is added.

Although an example in which there are two relationships between p, m, and n has been described above, the present disclosure is not necessarily limited to these relationships.

Also, although an example in which movement amount information of all the blocks in one frame is stored in the movement amount storage 102 has been described above, only information which is required when the still block selector 103 selects a still block may be stored in the movement amount storage 102.

Specifically, when the still block selector 103 reads movement amount information of two blocks from the movement amount storage 102 based on the corresponding block setting number, the movement amount storage 102 may have only a capacity to store movement amount information of two blocks. For example, movement amounts of four blocks, "100," "10," "20," and "5," are written in this stated order from the movement amount detector 101 to the movement amount storage 102, and the information "5" and "10" of two of the four blocks are transferred to the still block selector 103, the movement amount storage 102 may store only the information of two blocks, i.e., the movement amounts "5" and "10." In this case, when information is written from the movement amount detector 101 to the movement amount storage 102, "100" is initially input and stored. Next, "10" is input. As a result, "10" and "100" are stored. Next, "20" is input, and "100" is erased, so that "10" and "20," which is smaller than "100," are stored. Finally, "5" is input, and "20" is erased, so that "5" and "10" are stored. Thus, by invariably storing smaller movement amounts of two blocks, the capacity of the movement amount storage 102 can be reduced.

<Processing of Still Blocks>

Figure 6:
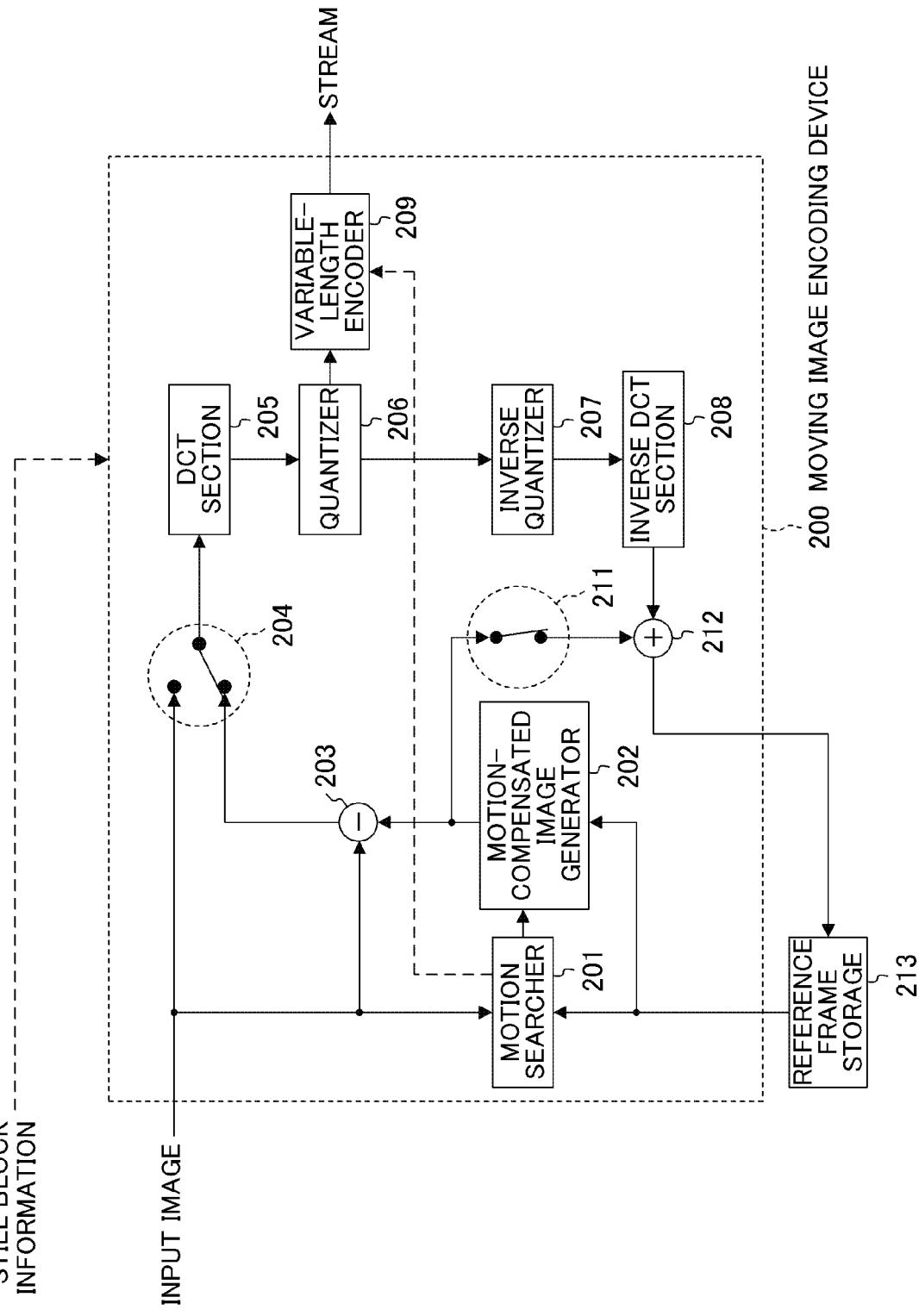
FIG. 6 is a block diagram showing a detailed configuration of a moving image encoder of FIGS. 1 and 2.

The moving image encoding process which is performed when still block information output from the still block selector 103 and an input image to be encoded are received will be described with reference to FIG. 6. Note that because the present disclosure has an advantage with respect to inter-encoding, inter-encoding will mainly be described as an example.

In a typical inter-encoding process, an image is initially input to a motion searcher 201. A frame image (reference image) which has already been processed is also input to the motion searcher 201. The motion searcher 201 performs a motion search using the input image and the reference image. The result of the motion search is transferred to a motion-compensated image generator 202, which then generates a motion-compensated image from the reference image. Thereafter, a difference image between the input image and the motion-compensated image is generated using a subtractor 203, and is then transferred to a selector 204. The selector 204 selects the input image when intra-encoding is performed, and the difference image output from the subtractor 203 when inter-encoding is performed. In this example, in order to describe inter-encoding, the selector 204 selects the difference image. The difference image is input to a DCT section 205, which then performs DCT, and thereafter, the resultant data is transferred to a quantizer 206, which then performs quantization, to generate DCT coefficients. The DCT coefficients are transferred to a variable-length encoder 209, which then performs variable-length encoding. The variable-length encoder 209 also receives motion vector information from the motion searcher 201, and encodes the motion vector information. The variable-length encoder 209 generates variable-length encoded information containing both the motion vector information and the DCT coefficients. The variable-length encoded information generated by the variable-length encoder 209 is output as a generated stream to the outside.

The DCT coefficients generated by the quantizer 206 are also transferred to an inverse quantizer 207, which then performs inverse quantization. Thereafter, the resultant data is transferred to an inverse DCT section 208, which then performs inverse DCT. The resultant data, and a motion-compensated image input from the motion-compensated image generator 202 via a switch 211, are added together by an adder 212 to generate a reference image, which is then stored into the reference frame storage 213.

A process with respect to a block which has been determined to be a still block by the aforementioned typical inter-encoding process will be described hereinafter. The inter-encoding process is performed on a block-by-block basis. Still block information indicating whether a block is a move block or a still block is input to the moving image encoder 200.

For still blocks, a motion search which is performed by the motion searcher 201 is not performed, and the results of the motion search (motion vectors) are output as zeros to the motion-compensated image generator 202 and the variable-length encoder 209. Also, DCT which is performed by the DCT section 205 and quantization which is performed by the quantizer 206 are not performed, and the results of quantization (DCT coefficients) are output as zeros to the variable-length encoder 209 and the inverse quantizer 207. Of course, the inverse quantizer 207 and the inverse DCT section 208 also do not perform processing, and the inverse DCT section 208 outputs zeros to the adder 212. Thus, for still blocks, a motion search, DCT, quantization, inverse quantization, and inverse DCT can be skipped.

As described above, of the blocks in each frame, more than a predetermined number of blocks are intentionally set to still blocks, and the process is invariably skipped for the still blocks. As a result, frame processing can be sped up by more than a predetermined rate, compared to a case where a typical encoding process is performed with respect to all the blocks. By utilizing this function, a high-resolution process or a high-frame-rate process, which require high-speed processing, can be achieved using a smaller implementation size. Also, because frame processing is performed at higher speed, the process can be more quickly completed, leading to lower power consumption.

Although square blocks of p×p and m×m are used in this embodiment, rectangular blocks of, for example, px×py and mx×my (px, py, mx, and my are each an integer of one or more) may be used. Alternatively, blocks of nx in the horizontal direction×ny in the vertical direction (nx and ny are each an integer of one or more, where n is a reduction ratio for each direction) may be used, and a reduction process may be performed, depending on the reduction ratio.

Although an example in which the motion vectors and the DCT coefficients are both set to zeros for still blocks has been described in this embodiment, only either of the motion vectors and the DCT coefficients may be set to zeros (only the motion vectors are set to zeros or only the DCT coefficients are set to zeros), and only a motion search may not be performed, or DCT, quantization, inverse quantization, and inverse DCT may not be performed. In this case, of course, frame processing can also be sped up to a sufficient extent.

Second Embodiment

In a second embodiment, a modified version of the first embodiment will be described.

In the first embodiment, by selecting more than a predetermined number of still blocks per frame, frame processing can be sped up by a predetermined rate and power consumption can be reduced. However, as indicated by an example shown in FIG. 7, if a predetermined block is designated as a still block over several consecutive frames, the block is forcibly encoded into "motion vector=0" and "difference image=0." Therefore, the same image as that of the previous frame is invariably output over several consecutive frames. A problem does not arise when an image is still without being moved even by one pixel. However, a block may be designated as a still block because the movement amount calculated by expression (1) is smaller than those of other blocks, although the image is moved by several pixels between each frame. In this case, the image is updated only once every several frames (the block is not designated as a move block), the image quality of a moving image may be degraded. In the second embodiment, a solution for this problem will be described.

As has already been described in the first embodiment, a corresponding block setting number which specifies the number of blocks in each frame which are set to still blocks is input to the still block detector 100. The above problem is solved by changing the value of the corresponding block setting number every frame.

At a predetermined frame (q-th frame), the corresponding block setting number is set to a non-zero value to obtain the speeding-up effect. At the next frame ((q+1)th frame), the corresponding block setting number is set to zero, and all the blocks are encoded as move blocks. At the next frame ((q+2) th frame), the corresponding block setting number is set to a non-zero value to obtain the speeding-up effect as is similar to the q-th frame.

Figure 7:
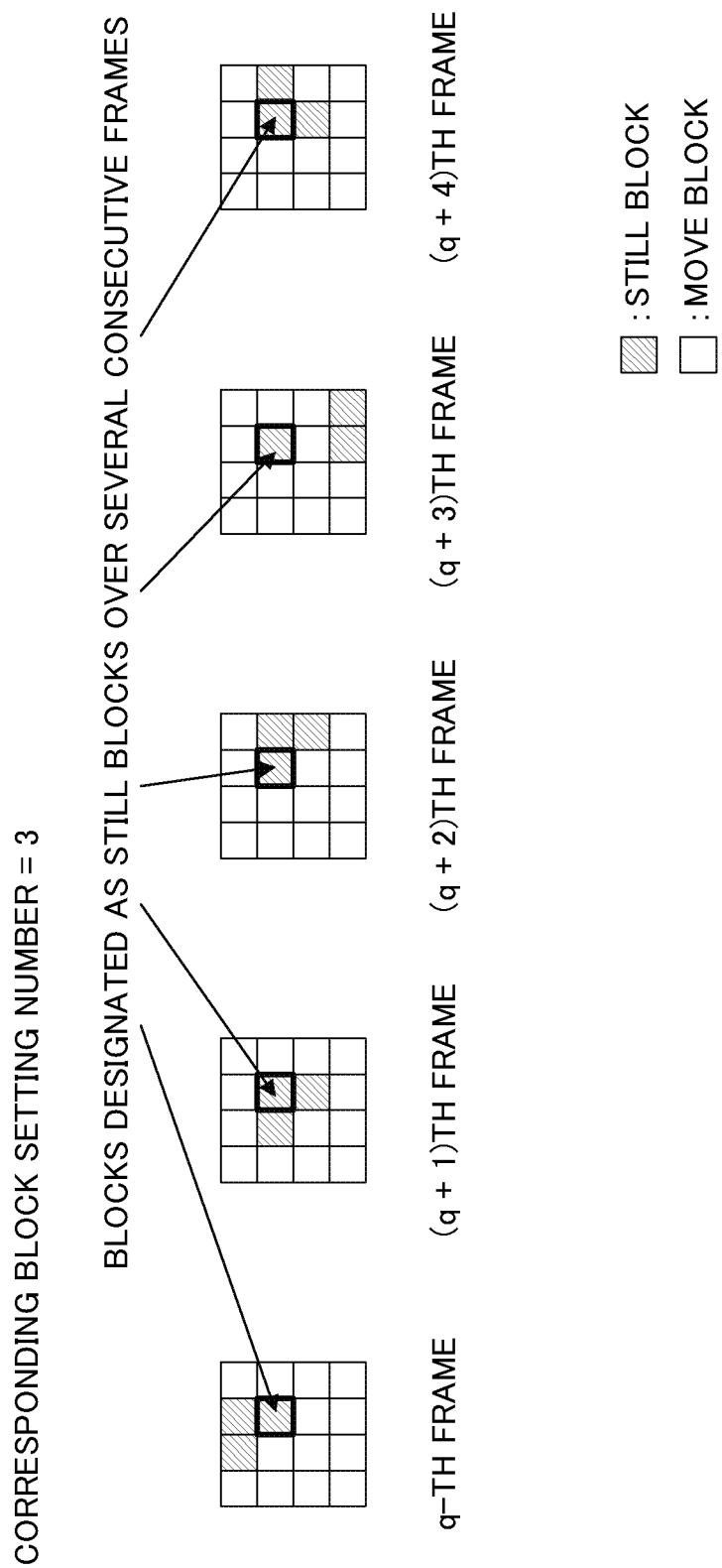
FIG. 7 is a diagram showing that, in the first embodiment of the present disclosure, blocks at the same position may be designated as still blocks over several consecutive frames.

Thus, by setting the corresponding block setting number to zero and a non-zero value at alternate frames, a predetermined number of still blocks can invariably be set, whereby the speeding-up effect can be obtained, and in addition, it is possible to reduce or prevent the situation that, as shown in FIG. 7, the same block is designated as a still block over several consecutive frames.

Although an example in which the corresponding block setting number is set to zero once every two frames has been described above, the corresponding block setting number may, of course, be set to zero once every r frames (r is an integer of two or more) and a non-zero value at the other frames.

Figure 8:
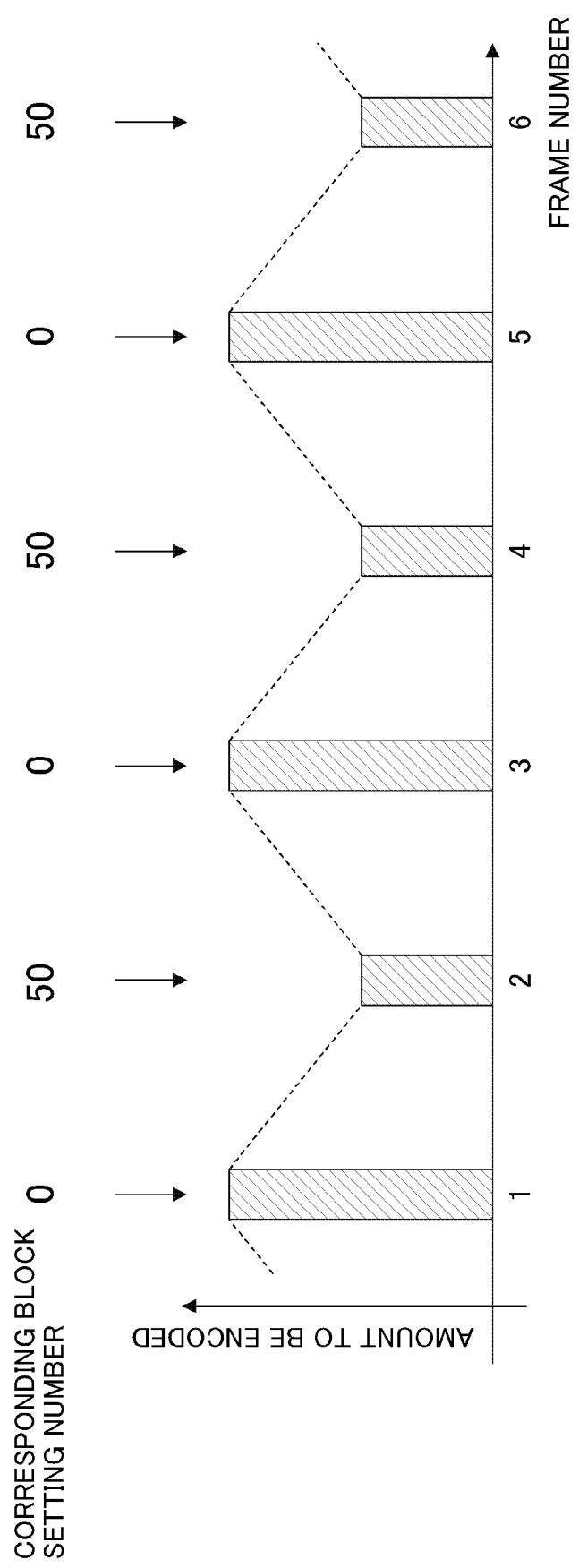
FIG. 8 is a diagram showing that, in the first embodiment of the present disclosure, the situation of FIG. 7 can be avoided by setting a corresponding block setting number to zero and a non-zero value at alternate frames and, as a result, the amount of data to be encoded varies significantly.

When encoding is performed while the corresponding block setting number is switched on a frame-by-frame basis, the amount of data to be encoded of a frame varies significantly as shown in the FIG. 8. Of course, the amount of data to be encoded increases when the corresponding block setting number is zero, and decreases when the corresponding block setting number is a non-zero value. Therefore, for example, when the amount of data to be encoded at the previous frame and the quantization parameter at the previous frame are used in a bit rate control, the following problem arises.

In general, when the amount of data to be encoded is small at the previous frame, a control is performed to increase the amount of data to be encoded at the next frame. Conversely, when the amount of data to be encoded is large at the previous frame, a control is performed to decrease the amount of data to be encoded at the next frame. However, if the amount of data to be encoded alternately increases and decreases as shown in FIG. 8, a stable bit rate control cannot be performed. In other words, even when the same quantization parameter is set, the amount of data to be encoded is large at some frames while the amount of data to be encoded is small at the other frames, and therefore, it is difficult to perform the bit rate control.

Figure 9:
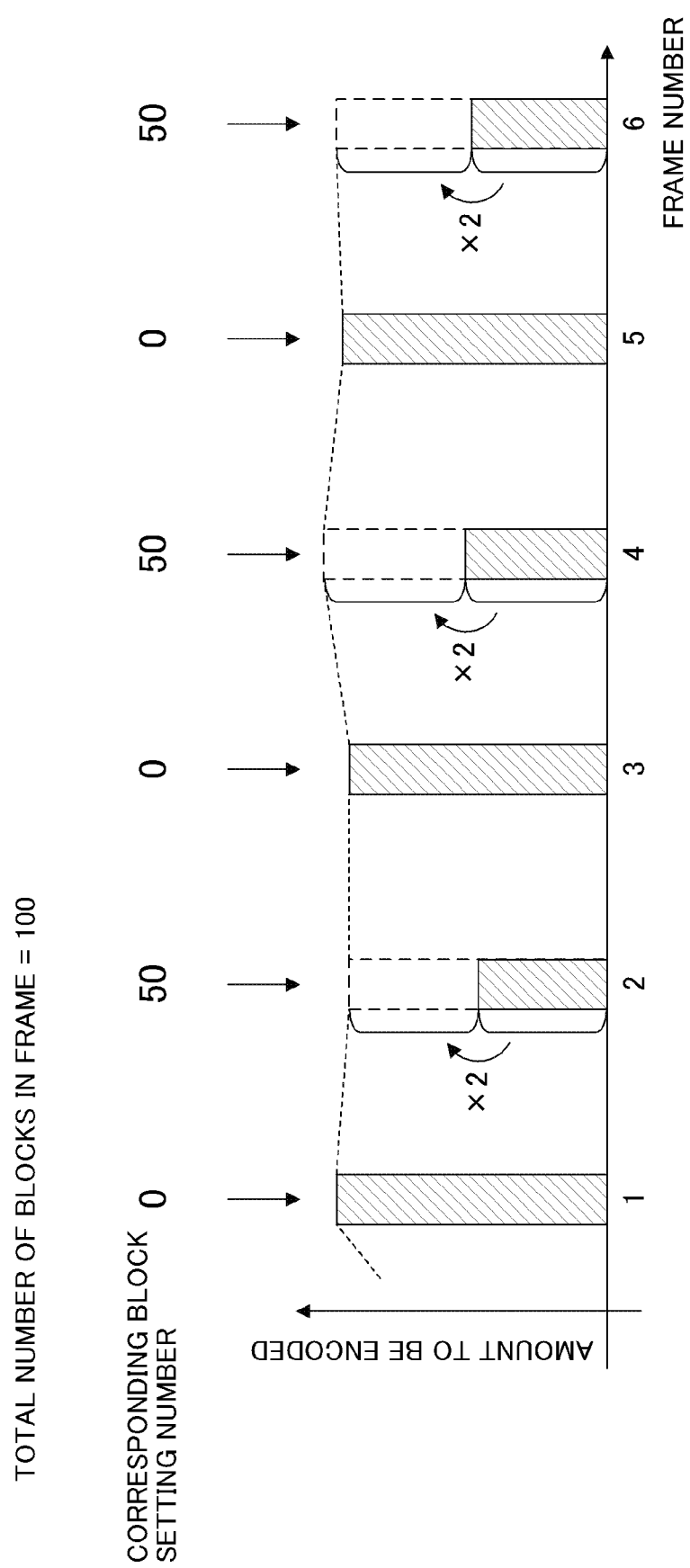
FIG. 9 is a diagram showing that, in a second embodiment of the present disclosure in which the estimated amount of data to be encoded is corrected, a bit rate control which is more stable than in the case of FIG. 8 can be achieved.

This problem is solved by a method shown in FIG. 9. In the example of FIG. 9, the total number of blocks in each frame is 100, and the corresponding block setting number is set to zero and 50 at alternate frames during encoding. At frames for which the corresponding block setting number is 50, only about ½ of the blocks in the frame is encoded, and therefore, the amount of data to be encoded in the frame is also approximately halved. In contrast to this, when all the blocks in a frame are set to move blocks, the amount of data to be encoded is estimated and calculated as "the amount of data to be encoded×the total number of blocks in a frame/the corresponding block setting number (=the amount of data to be encoded×100/50=the amount of data to be encoded×2)." In the example of FIG. 9, the actual amount of data to be encoded is multiplied by two. By using the estimated value of the amount of data to be encoded in a bit rate control, substantially the same amount of data to be encoded is apparently output with respect to the same quantization parameter, whereby a more stable bit rate control can be achieved.

In the above description, the amount of data to be encoded at the previous frame which is used when the quantization parameter for the next frame is decided is temporarily defined. Of course, the amount of data to be encoded as it is before being multiplied by the above coefficient needs to be used to calculate a difference from the target amount of data to be encoded.

Third Embodiment

In a third embodiment, another modified version of the first embodiment will be described.

In the first embodiment, an example has been described in which still blocks in a frame to be encoded are decided (i.e., the positions of blocks as still blocks are set) in the still block detector 100, and next, when encoding is performed in the moving image encoder 200, a portion of the encoding process is skipped for the still blocks.

Figure 10:
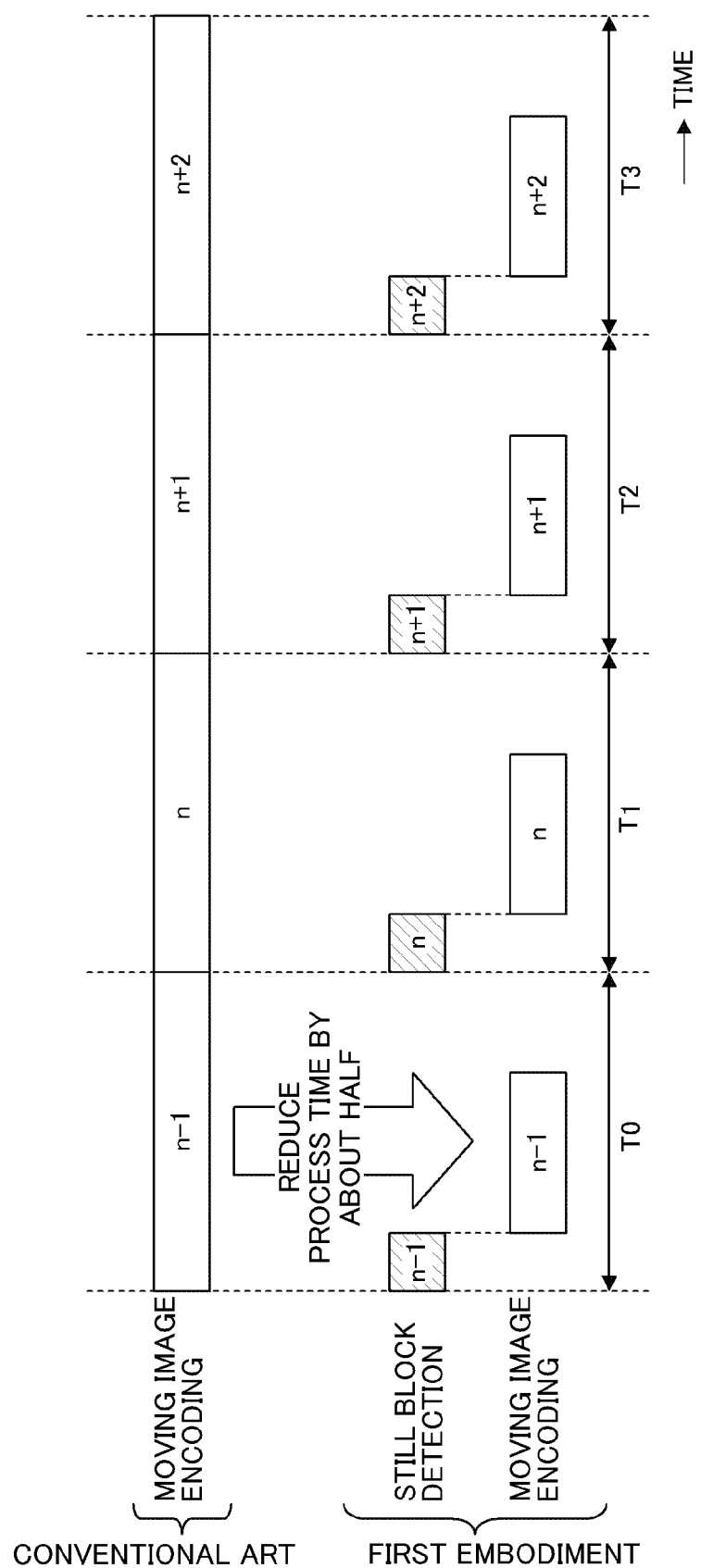
FIG. 10 is a time chart showing that, in the first embodiment of the present disclosure, although the process time is reduced compared to the conventional art, a still block detection process and a moving image encoding process are sequentially performed.

In this case, however, the process of the still block detector 100 and the process of the moving image encoder 200 in FIG. 1 are sequentially performed (see FIG. 10). In the third embodiment, a method for further speeding up frame processing will be described.

Figure 11:
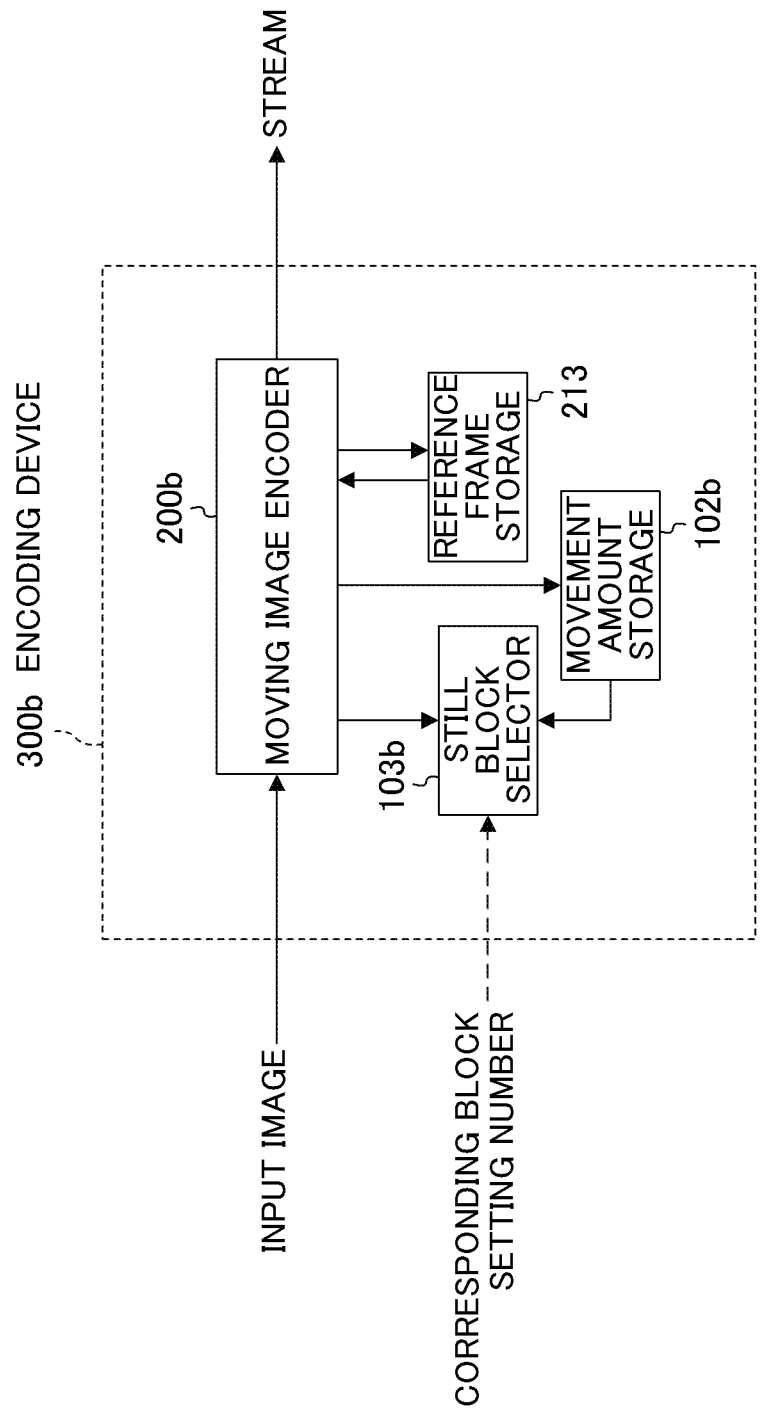
FIG. 11 is a block diagram showing a configuration of an encoding device according to a third embodiment of the present disclosure.

In the first embodiment, an example has been described with reference to FIG. 1 in which the still block detector 100 which perform the still block determination and the moving image encoder 200 which performs the encoding process are separate sections. In contrast to this, in an encoding device 300*b* of this embodiment, as shown in FIG. 11, the still block determination and the encoding process are performed by the same section, i.e., a moving image encoder 200*b*. When the encoding process is performed with respect to the s-th frame (s is an integer), still blocks in the (s+1)th frame are decided in a motion search performed in the motion searcher 201*b* (see FIG. 12).

Figure 12:
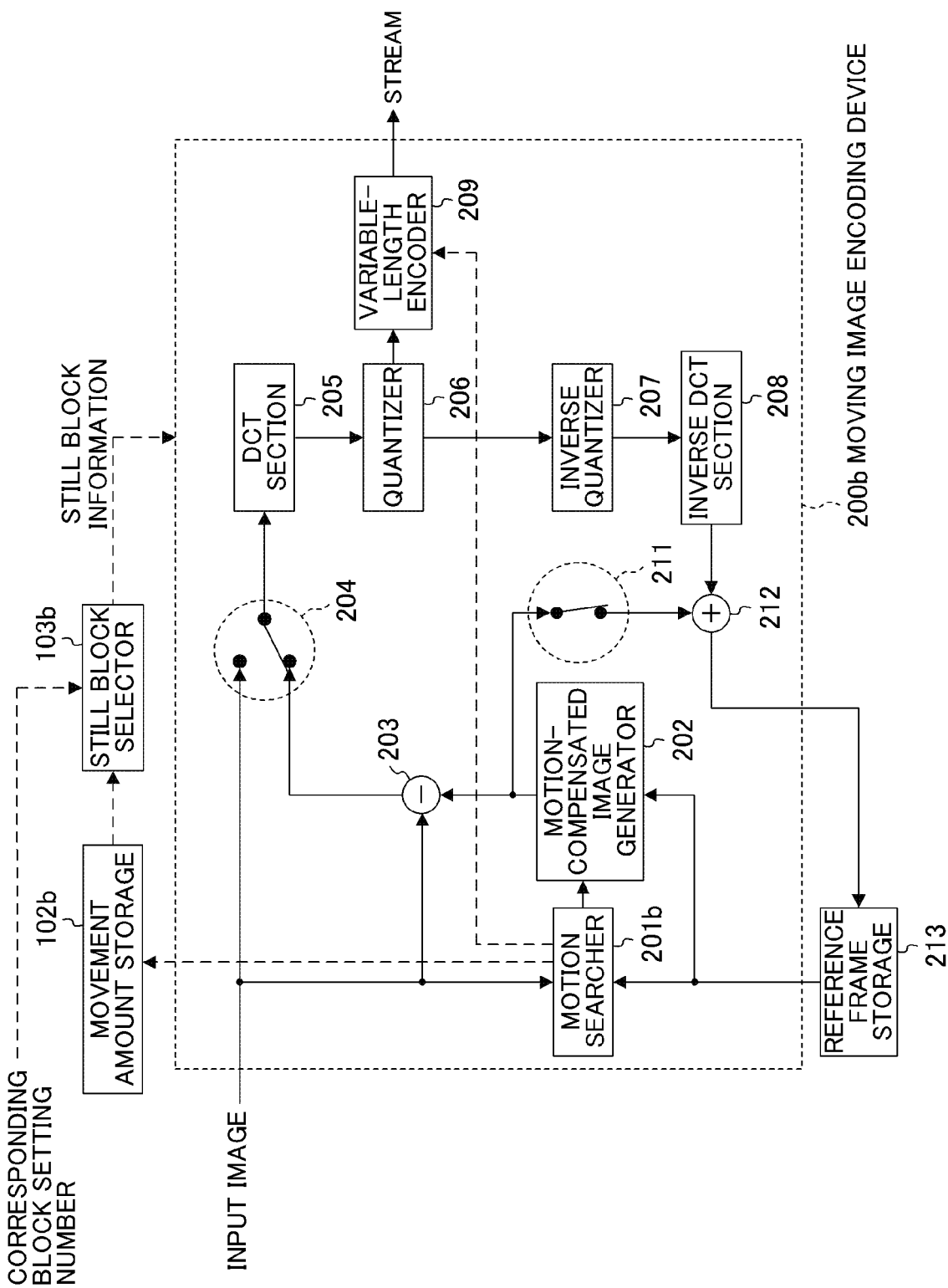
FIG. 12 is a block diagram showing a detailed configuration of a moving image encoder of FIG. 11.

More specifically, an input image and a reference image are input to a motion searcher 201*b* of FIG. 12, and a motion search is then performed. In this case, the movement amount described in expression (1) is simultaneously calculated, and the result is stored into a movement amount storage 102*b*. When one frame has been completely processed (movement amount detection), portions of movement amount information stored in the movement amount storage 102*b* are sorted and output to a still block selector 103*b* in ascending order of movement amount. In the still block selector 103*b*, still blocks the number of which is equal to a corresponding block setting number, are decided, and the still block information is output to the moving image encoder 200*b*.

In the still block selector 103*b*, the relationship between p, m, and n when still blocks are decided is, of course, "p=m" and "n=1" because a reduced image is not used to perform the still block detection.

Figure 13:
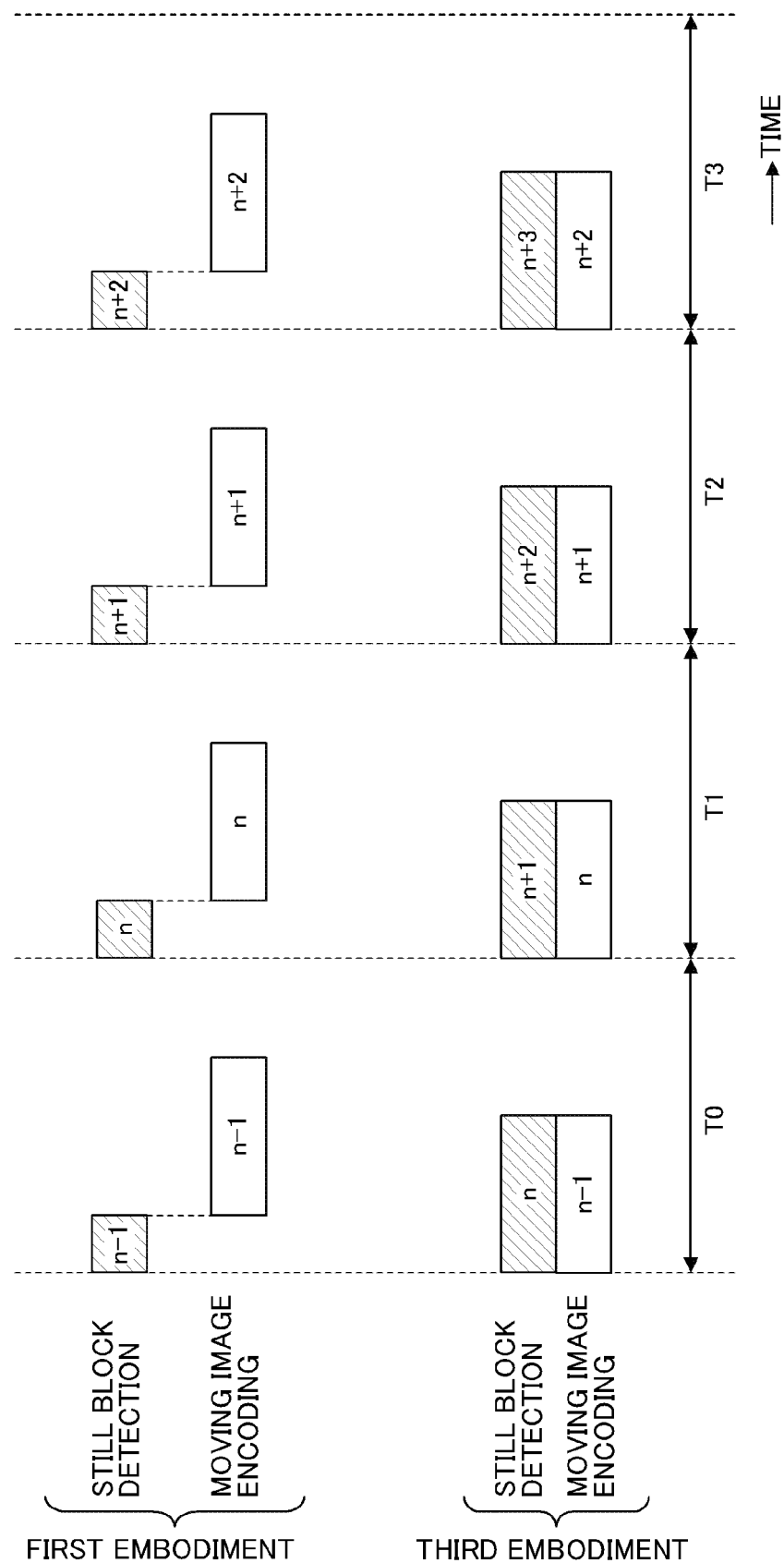
FIG. 13 is a time chart showing that, in the third embodiment of the present disclosure, by employing parallel processing, the process time can be reduced compared to the first embodiment.

Thus, according to the third embodiment of the present disclosure, the still block information set by the still block selector 103*b* is used as still block position information when the next frame is processed. In other words, by performing the still block detection and the moving image encoding process in parallel, frame processing can be more quickly completed (see FIG. 13).

The encoding devices 300 and 300b of the first to third embodiments of the present disclosure have been described above. Next, example applications of the encoding devices 300 and 300b will be described.

Figure 14:
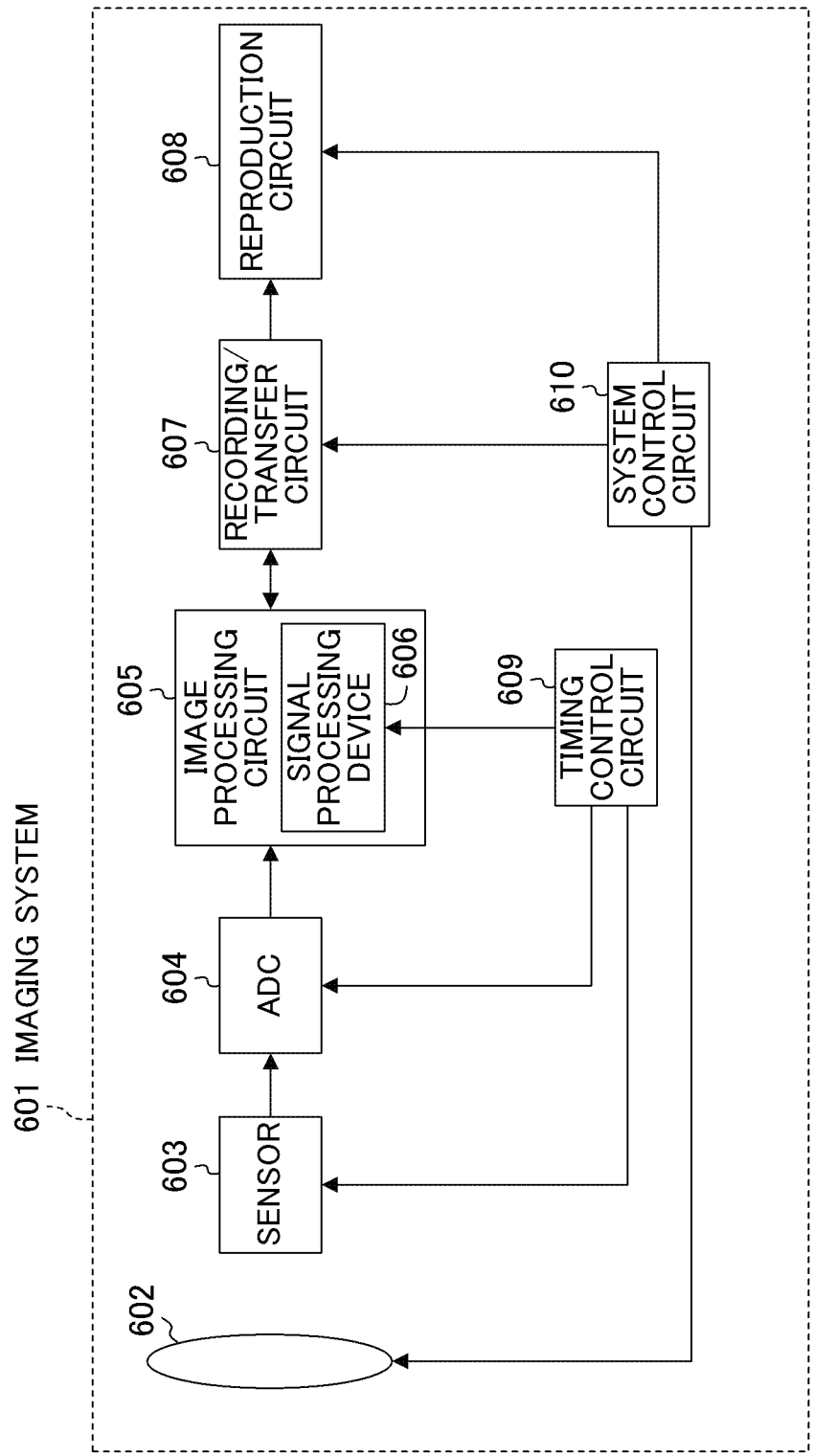
FIG. 14 is a block diagram showing a configuration of an imaging system including the encoding device of the present disclosure.

FIG. 14 is a block diagram showing a configuration of an imaging system 601 including the encoding device of the present disclosure, such as a digital still camera (DSC). A signal processor 606 of FIG. 14 is either of the encoding devices 300 and 300b of the first to third embodiments of the present disclosure.

As shown in FIG. 14, image light entering through an optical system 602 is imaged on a sensor 603. The sensor 603 is driven by a timing control circuit 609 to accumulate and convert the imaged image light into an electrical signal (photoelectric conversion). An electrical signal read from the sensor 603 is converted into a digital signal by an analog-to-digital converter (ADC) 604, and the digital signal is input to an image processing circuit 605 including the signal processor 606. The image processing circuit 605 performs image processing, such as a Y/C process, an edge process, an image enlargement/reduction process, and an image compression/decompression process employing the present disclosure, etc. The processed image signal is recorded or transferred to a medium by a recording/transfer circuit 607. The recorded or transferred signal is reproduced by a reproduction circuit 608. The entire imaging system 601 is controlled by a system control circuit 610.

Note that the image processing performed by the signal processor 606 of the present disclosure is not necessarily applied to only a signal based on image light which is imaged by the sensor 603 via the optical system 602, and of course, may be applied to, for example, an image signal which is input as an electrical signal from external device.

As described above, the encoding method and the encoding device of the present disclosure can be used to quickly complete an encoding process, and therefore, is useful for imaging systems which require high performance, such as a high frame rate, a high resolution, etc.

What is claimed is:

1. A method for encoding a moving image using motion vectors which are generated by dividing a frame to be processed into a plurality of blocks and performing a motion search with respect to each of the plurality of blocks using an input image and an already encoded reference image, the method comprising the steps of:
   selecting S blocks from the plurality of blocks in the frame, where S is an integer of one or more and less than the number of all the blocks of the frame;
   encoding the moving image by forcibly replacing the motion vectors with zeros without performing the motion search, with respect to the selected S blocks;
   correcting the amount of data to be encoded by multiplying the amount of data to be encoded of a previous frame by the total number of blocks/S; and
   performing a bit rate control based on the corrected amount of data to be encoded,
   wherein the encoding the moving image by forcibly replacing the motion vectors with zeros is performed only r−1 times with respect to r frames, where r is an integer of two or more.

2. A method for encoding a moving image using DCT coefficients which are generated by dividing a frame to be processed into a plurality of blocks and performing DCT and quantization with respect to each of the plurality of blocks, the method comprising the steps of:
   selecting S blocks from the plurality of blocks in the frame, where S is an integer of one or more and less than the number of all the blocks of the frame;
   encoding the moving image by forcibly replacing the DCT coefficients with zeros without performing the DCT and the quantization, with respect to the selected S blocks and performing the DCT and the quantization, except for the selected S blocks;
   correcting the amount of data to be encoded by multiplying the amount of data to be encoded of a previous frame by the total number of blocks/S; and
   performing a bit rate control based on the corrected amount of data to be encoded,
   wherein the encoding the moving image by forcibly replacing the DCT coefficients with zeros is performed only r−1 times with respect to r frames, where r is an integer of two or more.

3. A device for encoding a moving image using motion vectors which are generated by dividing a frame to be processed into a plurality of blocks and performing a motion search with respect to each of the plurality of blocks using an input image and an already encoded reference image, the device comprising:
   an input image reducer configured to reduce the input image to be encoded, by a factor of n, where n is an integer of one or more, to generate a reduced input image;
   a reference image reducer configured to reduce the already encoded reference image by a factor of n to generate a reduced reference image;
   a movement amount detector configured to receive the reduced input image and the reduced reference image from the input image reducer and the reference image reducer, and detect a movement amount with respect to each of the plurality of blocks;
   a movement amount storage configured to store the movement amounts detected by the movement amount detector;
   a still block selector configured to compare the movement amounts stored in the movement amount storage and select S blocks in order of small movement amounts, where S is an integer of one or more and less than the number of all the blocks of the frame; and
   a moving image encoder configured to encode the moving image by forcibly replacing the motion vectors with zeros without performing the motion search, with respect to the selected S blocks.

4. A device for encoding a moving image using DCT coefficients which are generated by dividing a frame to be processed into a plurality of blocks and performing DCT and quantization with respect to each of the plurality of blocks, the device comprising:
   an input image reducer configured to reduce the input image to be encoded, by a factor of n, where n is an integer of one or more, to generate a reduced input image;
   a reference image reducer configured to reduce the already encoded reference image by a factor of n to generate a reduced reference image;
   a movement amount detector configured to receive the reduced input image and the reduced reference image from the input image reducer and the reference image reducer, and detect a movement amount with respect to each of the plurality of blocks;

a movement amount storage configured to store the movement amounts detected by the movement amount detector;

a still block selector configured to compare the movement amounts stored in the movement amount storage to select S blocks having the smallest movement amounts, where S is an integer of one or more and less than the number of all the blocks of the frame; and a moving image encoder configured to encode the moving image by forcibly replacing the DCT coefficients with zeros without performing the DCT and the quantization, with respect to the selected S blocks.

5. The device of claim 3, wherein the encoding the moving image by forcibly replacing the motion vectors with zeros is performed only r−1 times with respect to r frames, where r is an integer of two or more.

6. The device of claim 5, further comprising:
a section configured to correct the amount of data to be encoded by multiplying the amount of data to be encoded of a previous frame by the total number of blocks/S, and perform a bit rate control based on the corrected amount of data to be encoded.

7. An imaging system comprising:
an image processing circuit including the device of claim 3;
a sensor configured to convert image light into an image signal;
an optical system configured to image incident image light onto the sensor; and
a converter configured to convert the image signal into digital data and output the digital data to the image processing circuit.

8. A signal processing system comprising:
an image processing circuit including the device of claim 3; and
a converter configured to convert an input image signal having an analog value into digital data and output the digital data to the image processing circuit.

9. The device of claim 4, wherein the encoding the moving image by forcibly replacing the DCT coefficients with zeros is performed only r−1 times with respect to r frames, where r is an integer of two or more.

10. The device of claim 9, further comprising:
a section configured to correct the amount of data to be encoded by multiplying the amount of data to be encoded of a previous frame by the total number of blocks/S, and perform a bit rate control based on the corrected amount of data to be encoded.

11. An imaging system comprising:
an image processing circuit including the device of claim 4;
a sensor configured to convert image light into an image signal;
an optical system configured to image incident image light onto the sensor; and
a converter configured to convert the image signal into digital data and output the digital data to the image processing circuit.

12. A signal processing system comprising:
an image processing circuit including the device of claim 4; and
a converter configured to convert an input image signal having an analog value into digital data and output the digital data to the image processing circuit.

* * * * *